Figure 1:
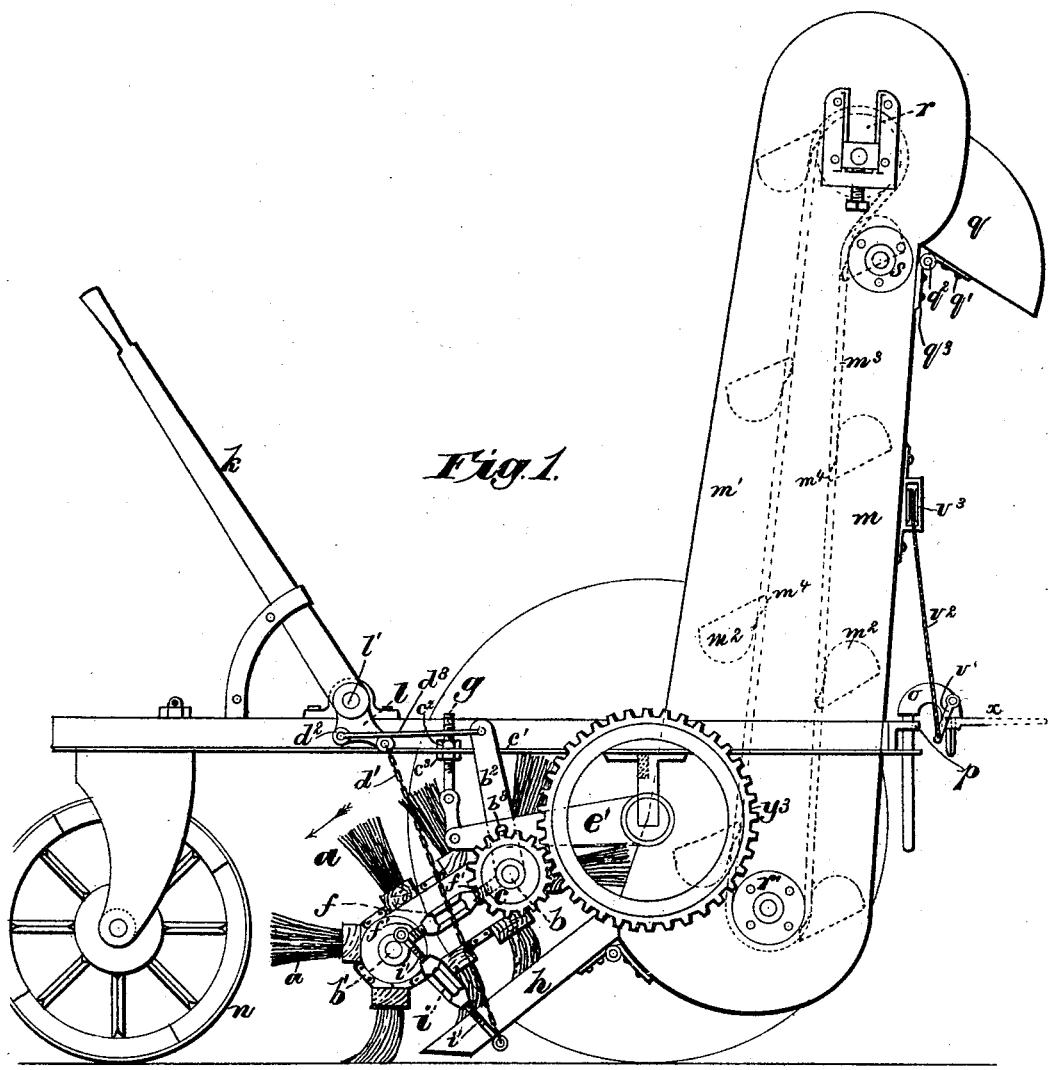

(No Model.) 2 Sheets—Sheet 1.

W. MARCH.
MACHINERY FOR SWEEPING AND CONVEYING AWAY REFUSE FROM STREETS.

No. 328,795. Patented Oct. 20, 1885.

Witnesses
Robt. Everett,
J. A. Rutherford

Inventor
William March
By James L. Norris
Atty.

(No Model.) 2 Sheets—Sheet 2.
W. MARCH.
MACHINERY FOR SWEEPING AND CONVEYING AWAY REFUSE FROM STREETS.
No. 328,795. Patented Oct. 20, 1885.
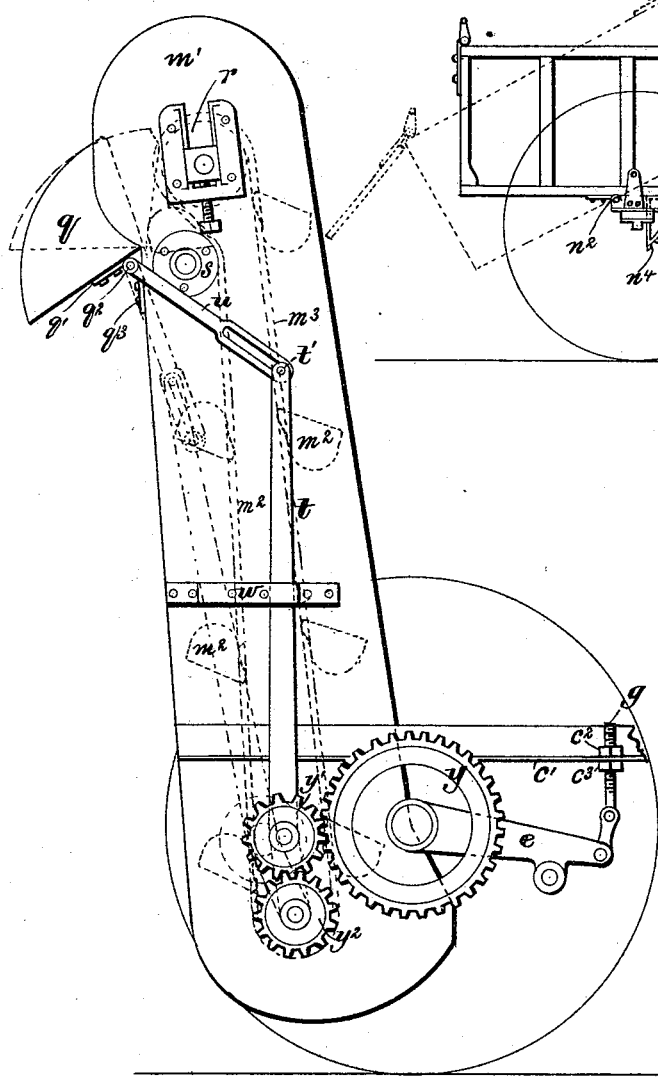

UNITED STATES PATENT OFFICE.

WILLIAM MARCH, OF LONDON, ENGLAND.

MACHINERY FOR SWEEPING AND CONVEYING AWAY REFUSE FROM STREETS.

SPECIFICATION forming part of Letters Patent No. 328,795, dated October 20, 1885.

Application filed October 16, 1884. Serial No. 145,675. (No model.) Patented in England January 1, 1884, No. 91.

*To all whom it may concern:*

Be it known that I, WILLIAM MARCH, a subject of the Queen of Great Britain, residing at 3 St. Mary Axe, in the city of London, England, engineer, have invented new and useful Improvements in Machinery for Sweeping and Conveying away Refuse from Streets, Roadways, and other Places, (for which I have obtained a patent in Great Britain, No. 91, bearing date January 1, 1884,) of which the following is a specification, reference being hereby made to the accompanying drawings, in which similar letters of reference indicate corresponding parts.
Figure 1 is an elevation showing the right-hand side of my invention. Fig. 2 is an elevation of the left-hand side, and Fig. 3 is a modification of the same. Fig. 4 is a detail showing the manner of connecting the buckets to the chains so as to pass over wheels $s$.

My invention consists of a machine for working behind a cart or wagon, or to form part thereof, for the purpose of sweeping the roads as it proceeds, the cart or wagon being arranged to receive the sweepings.

A short endless chain with brushes or scrapers $a\ a$ is fitted upon the front shaft, as shown in the drawings. The chain revolves on two shafts, $b\ b'$, the upper shaft, $b$, being driven by a pinion, $c$, which gears into a spur-ring, $y^3$, bolted to one of the large road-wheels. Each brush, when necessary, is jointed or hinged in one or more parts of its length, so as to adapt itself more readily to uneven roads.
The axle of the large wheels is placed in the front part of the machine. The brushes sweep the refuse up an inclined brush-pan into the elevator-case, to which the pan is hinged. Two short levers, $e\ e'$, one on each side of the machine, are centered at their large ends upon the axle-collars. One of these levers, $e$, carries the shaft $b$ supporting the upper end of the chain of brushes. The other end of this shaft revolves not in the opposite lever, $e'$, but in the lower end of a small upright lever, $b^2$, depending therefrom, and which, being pivoted to lever $e'$ by a bolt, $b^3$, passing through both, enables the aforesaid pinion to be thrown in and out of gear. The two shafts of the chain of brushes are connected by a set of right and left threaded rods, $f'$, and elongated nuts $f$; the rods being terminated by eyes, in which both shafts revolve. The rear or small ends of each of the levers $e\ e'$ will be suspended from the angle-iron frame $C'$ by means of a screwed eyebolt, $g$, which passes loosely through the frame, and has one nut, $C^2$, above and one, $C^3$, below the frame, in the manner illustrted in Fig. 1, whereby the brushes can be lowered to the pan as they wear away. The lower end of the brush-pan $h$ is suspended at both sides by chains $d'$, fastened to cranks $l$, which are keyed to the rocking shaft $e'$ above. The brush-pan $h$ supports both ends of the hind shaft, $b'$, of the brushes by means of another set of right and left threaded rods, $i'$, and elongated nuts $i$, so that not only both the pan and brushes are raised simultaneously by depressing the hand-lever $k$ of the rocking shaft, but both pan and brushes are likewise free to rise over any unusual obstruction in the road.

The rocking-bar crank $l$ on the brush-pinion side of the machine (see Fig. 1) has a perforated boss, $d^2$, at its rear side, about half-way down. A rod, $d^3$, connects this boss to the top of the small upright lever $b^2$, whereby the pinion is thrown into and out of gear as the brush-pan is either lowered or raised by the hand-lever.

The elevator $m$ consists of an inclined case, $m'$, containing a series of buckets, $m^2$, which work inside or between the two chain-wheels $r\ r'$ and their chains $m^3$, the buckets being attached to the chains by flaps $m^4$, cast on the links of the chains, as will be clearly understood by reference to Figs. 1 and 4.

A little below the top wheels are two smaller wheels, $s$, which work upon short and independent shafts revolving in bearings, one on each side of the case. The small wheels gather in the descending part of the chains, so that the buckets which are fastened to them, after discharging their contents, are drawn inward, whereby the inner edge of the shoot $q$ can be placed directly under the spot where the buckets begin to empty themselves. The elevator is driven by a spur-ring, $y$, on the left-hand large wheel and the pinions $y'\ y^2$, the pinion $y'$ being thrown out of mesh with ring $y$ by means of the lever $t$, the said pinion being keyed onto a short shaft revolving in the lever $t$, while the lower end of the lever is centered upon the lower shaft of the elevator or upon the circular bearing of that shaft, as shown in Fig. 2. The upper end of this lever has a pin, $t'$, fixed into it, which slides in a slot in the chute-lever $u$, so that when the pinion-lever is drawn back to disengage the pinion $y'$ it at the same time raises the chute $q$, the slotted lever $u$ and eyes $q'$ of the chute being keyed to a rocking shaft, $q^2$, working upon eye-straps $q^3$, fastened to the case.

The pinion-lever $t$ is held in position by a movable pin, which passes through the guide-frame $w$, in which the lever works.

The machine is supported at its rear end by a small wheel, $n$. The machine is fastened behind the draft-wagon which receives the sweepings by an upright hook, $o$, the rear part of which slides freely up and down in a round hole of a block or jaw-piece, $p$, fastened in front of the case. The fore part of the hook is square, and enters a square hole of an iron block, (shown in dotted lines at $x$ in Fig. 1,) and bolted underneath and at the end of the wagon. A catch, $v'$, operated by a rope, $v^2$, passed over a pulley, $v^3$, falls under the block to prevent the hook rising.

Should it be required to dispense with a separate wagon and place a receptacle for the mud upon the machine itself, this may be effected, as shown in Fig. 3, by carrying the large wheels farther back and placing the wheel $n$ in front of the elevator and causing it to revolve in an arched pedestal, $n'$, with a perch-bolt at the top for locking. The elevator-case will then incline inward instead of outward, and the buckets will run in the opposite direction.

The body will be supported on the frame by a hinge, $n^2$, underneath the body and a little to the rear of the center of its length, and will be tipped by a worm, $n^3$, and segment of a worm-wheel, $n^4$, the latter being bolted to the under frame of the body. The bearings of the worm-shaft and the necessary miter-wheel shaft will be bolted to the fixed frame upon which the body rests.

Having now particularly described and ascertained the nature of my said invention and in what manner the same is to be performed, I would have it understood that I do not confine myself to the exact arrangement of all the parts herein described, which may be varied without departing from the nature of the invention.

I declare that what I claim is—

1. The combination of the wheeled support, the spur-ring $y^3$, connected with one of the drive-wheels of said support, the chain of brushes, the lever-supports $e\ e'$, the lever $b^2$, pivoted to support $e'$, the upper shaft of the chain of brushes journaled at one end in support $e$ and at the other end in said lever $b^2$ and provided with a pinion meshing with the spur-ring on said drive-wheel, the lever fulcrumed on the wheeled support, and the rod connecting said lever with the lever $b^2$, to throw said pinion in and out of mesh, substantially as described.

2. The combination of the wheeled support, the elevator-case $m'$, the pan $h$, hinged thereto, the hinged levers $e\ e'$, the chain of brushes $a$, connected with pan $h$, the lever $b^2$, pivoted to lever $e'$, the shaft $b$, provided with pinion $c$, meshing with spur-ring $y^3$, connected to one of the wheels of the wheeled support and journaled at one end in the lever $b^2$ and at the other end in lever $e$, and the lever $k$, connected with pan $h$ and lever $b^2$, whereby both pan and brushes may be raised and the pinion $c$ thrown out of mesh by the same lever $k$, substantially as described.

3. The combination, with a wheeled support and an elevator connected therewith, of the pan $h$, the hinged levers $e\ e'$, the lever $b^2$, the chain of brushes connected with levers $e$ and $b^2$, the frame $c'$, bolts $g$, connected with said levers $e\ e'$, and nuts $c^2\ c^3$ on said bolts above and below said frame, whereby said brushes may be adjusted to and from said pan, substantially as described.

4. The combination of a wheeled support having a spur-ring, $y$, operated from one of its drive-wheels, an elevator-case provided with an endless chain of buckets, a pivoted lever, $t$, provided with a pinion, $y'$, meshing with the spur-ring $y$ and a pinion, $y^2$, on one shaft of the bucket-chain, a slotted lever, $u$, connected with lever $t$, and a hinged chute, $q$, connected with lever $u$, substantially as described.

5. The combination of the elevator-case, the endless chain of buckets, wheels $r$ and $r'$ for supporting the same at top and bottom, the delivery-chute at the upper end of the case, and the gathering-wheels $s$ below the wheels $r$ and between the bucket-chain and inner end of chute $q$, as shown, to permit the inner edge of the chute to be brought directly under the spot where the buckets begin to empty, substantially as described.

6. The combination, with a wheeled support and an elevator-case, $m'$, of the hook $o$, the catch $v'$, attached thereto, and the rope $v^2$, secured to said catch and the case, substantially as described.

7. The combination of a wheeled support, an elevator carrying an endless chain of buckets, an endless chain of brushes for sweeping into said elevator-buckets, a delivery-chute, $q$, at the upper end of the elevator, and a receiving-receptacle to receive sweepings from said chute, substantially as described.

In testimony whereof I have hereunto set my hand this 1st day of October, 1884.

WILLIAM MARCH.

Witnesses:
GEO. C. DOWNING,
   3 *Quality Ct. London.*
PERCY R. GOLDRING,
   17 *Gracechurch Street, London.*